US012707150B2

(12) United States Patent
Fiebig et al.

(10) Patent No.: US 12,707,150 B2
(45) Date of Patent: Aug. 11, 2026

(54) SYSTEM AND METHOD FOR CAMERA HANDLING IN LIVE ENVIRONMENTS

(71) Applicant: OnstageAI, INC., Dix Hills, NY (US)

(72) Inventors: Jakub Fiebig, Warsaw (PL); Adam Borowski, Warsaw (PL); Dominik Slezak, Warsaw (PL); Andrzej Bukala, Szczecin (PL); Pawel Kowaleczko, Warsaw (PL); Zuzanna Kwiatkowska, Warsaw (PL); Jan Ludziejewski, Warsaw (PL); Andzelika Zalewska-Küpçü, Slawno (PL)

(73) Assignee: OnstageAI, INC., Dix Hills, NY (US)

( * ) Notice: Subject to any disclaimer, the term of this patent is extended or adjusted under 35 U.S.C. 154(b) by 0 days.

(21) Appl. No.: 18/241,708

(22) Filed: Sep. 1, 2023

(65) Prior Publication Data

US 2024/0080566 A1 Mar. 7, 2024

Related U.S. Application Data

(60) Provisional application No. 63/403,540, filed on Sep. 2, 2022.

(51) Int. Cl.
*H04N 23/695* (2023.01)
*G06V 10/778* (2022.01)
(Continued)

(52) U.S. Cl.
CPC ....... *H04N 23/695* (2023.01); *G06V 10/7788* (2022.01); *G06V 40/174* (2022.01);
(Continued)

(58) Field of Classification Search
CPC ...... H04N 23/695; H04N 5/268; H04N 23/90; G06V 10/7788; G06V 40/174; G06V 10/774; G10H 1/0008; G10H 2210/076
See application file for complete search history.

(56) References Cited

U.S. PATENT DOCUMENTS 11,877,058 B1 * 1/2024 Slotznick ............. H04N 23/611
11,889,188 B1 * 1/2024 Slotznick ................. H04R 1/08
(Continued)

FOREIGN PATENT DOCUMENTS

JP 2021153257 9/2021
WO WO-2007071954 A1 * 6/2007 ............. G10H 1/363
(Continued)

OTHER PUBLICATIONS

International Preliminary Report on Patentability as received from the International Bureau on Mar. 1, 2025 for PCT Application No. PCT/US23/31913.

(Continued)

*Primary Examiner* — John R Schnurr

(74) *Attorney, Agent, or Firm* — HOGAN LOVELLS US LLP

(57) ABSTRACT

At least one system and method herein are for camera handling in live environments. This includes determining a musical score to be performed in the live environment, analyzing a live version of the musical score with the recorded version of the musical score in a live environment, where the analysis is to determine a time-based difference of at least one frame in the live version against the recorded version, and where the time-based difference is to be used, along with at least one predominant effect of the recorded version or the live version, to enable camera selection or camera adjustments of one or more cameras in the live environment.

20 Claims, 7 Drawing Sheets

(51) Int. Cl.
*G06V 40/16* (2022.01)
*G10H 1/00* (2006.01)
*H04N 5/268* (2006.01)
*H04N 23/60* (2023.01)
*H04N 23/90* (2023.01)

(52) U.S. Cl.
CPC ........... *G10H 1/0008* (2013.01); *H04N 5/268* (2013.01); *H04N 23/64* (2023.01); *H04N 23/90* (2023.01); *G10H 2210/076* (2013.01)

(56) References Cited

U.S. PATENT DOCUMENTS

2008/0298796 A1* 12/2008 Kuberka ................ G03B 17/18 396/263
2010/0183280 A1 7/2010 Beauregard et al.
2014/0002464 A1* 1/2014 Furukawa ............... G10L 21/10 345/474
2014/0298975 A1* 10/2014 Clark ................... G10H 1/0025 84/626
2017/0091983 A1 3/2017 Sebastian et al.
2017/0251261 A1* 8/2017 James ................ H04N 21/2347
2018/0330152 A1 11/2018 Mittelstaedt et al.
2019/0215540 A1 7/2019 Nicol et al.
2019/0281223 A1* 9/2019 Kelly ................... H04N 23/667
2019/0387998 A1 12/2019 Garten et al.
2020/0042282 A1 2/2020 Rakshit
2020/0374456 A1* 11/2020 Kelly ..................... H04N 23/66
2023/0117158 A1* 4/2023 Choi ......................... A63J 5/02 315/129
2023/0262271 A1* 8/2023 Trestain ............. H04N 21/2187 725/105
2023/0269435 A1* 8/2023 Kramer ................ H04N 5/2621 725/23
2023/0319416 A1* 10/2023 Jordan .................. A63F 13/424 348/169
2023/0396873 A1* 12/2023 Nakai .................. H04N 23/632
2024/0022830 A1* 1/2024 Beziaeva .................. G06T 7/73
2024/0214674 A1* 6/2024 Dalati .................... H04N 23/90
2024/0244339 A1* 7/2024 Abe ....................... H04N 23/61

FOREIGN PATENT DOCUMENTS

WO 2015151766 10/2015
WO WO-2023171120 A1 * 9/2023 ............... G06T 7/11

OTHER PUBLICATIONS

Schramm et al., Dynamic Time Warping for Music Conducting Gestures Evaluation. IEEE Transactions on Multimedia, vol. 17. No. 22, Feb. 2015, pp. 243-255 [online], [retrieved Nov. 30, 2023]. Retrieved from the Internet <URL:https://ieeexplore.IEEE.org/abstracl/documenl/6975197>, <DOI: 10.1109/TMM.2014.2377553>, entire document, especially p. 2, col. 2, para 2, p. 2, col. 1 para 4, p. 5, col. 2, para 2-p. 6, col. 1, para 1, p. 8, col. 1 para 4 and p. 9, col. 2, para 2.
Notice of Reason for Rejection issued in Japanese Application No. 2025 - 513321, dated Feb. 20, 2026 (with translation) (HL Ref.: 778359.013502).
Machine Translation of WO 2015151766, dated Mar. 18, 2026.
Machine Translation of JP 2021153257, dated Mar. 18, 2026.
Extended European Search Report issued in related EP Application No. 23861374.9, dated Jun. 15, 2026.

* cited by examiner

SYSTEM AND METHOD FOR CAMERA HANDLING IN LIVE ENVIRONMENTS

CROSS-REFERENCES TO RELATED APPLICATIONS

This application is related to and claims the benefit of priority from U.S. Provisional Application 63/403,540, titled SYSTEM AND METHOD FOR CAMERA HANDLING IN LIVE ENVIRONMENTS, filed Sep. 2, 2022, the entire disclosure of which is incorporated by reference herein for all intents and purposes.

BACKGROUND

1. Field of Invention

The disclosure herein relates in general to camera handling in live environments, and in particular, to addressing latency in tracking live version of audio in a live environment and to benefit of camera direction based on the live version of the audio in the live environment.

2. Description of the Prior Art

Audio recognition allows computer-based applications to determine a song by capturing a live version of a song. For known musical scores computer-based applications allow detection or an artist or the score using a brief recording of a live or recorded version of the musical score from an output device, such as a radio, a television, or even a person. Certain computer-based applications allow for a humming or other utterance to be used to attempt to detect the musical score.

SUMMARY

A processor-implemented method includes determining, by at least one processor, that at least one frame of a live version of a musical score being performed in a live environment corresponds to a recorded frame of a recorded version of the musical score. The method further includes enabling, by at least one camera, a camera movement that is according to a time-based reference between the at least one frame and the recorded frame and that is according at least one predominant effect of the recorded version or the live version.

A system herein is for tracking of a live version of a musical score to enable camera handling in live environments. The system may be associated with at least one camera, with memory, and with at least one processor to execute instructions stored in the memory to perform steps or functions that include determining that at least one frame of a live version of a musical score being performed in a live environment corresponds to a recorded frame of a recorded version of the musical score. The steps or functions further include enabling, by the at least one camera, a camera movement that is according to a time-based reference between the at least one frame and the recorded frame and that is according at least one predominant effect of the recorded version or the live version.

BRIEF DESCRIPTION OF THE DRAWINGS

Various embodiments in accordance with the present disclosure will be described with reference to the drawings, in which.

DETAILED DESCRIPTION

Figure 1:
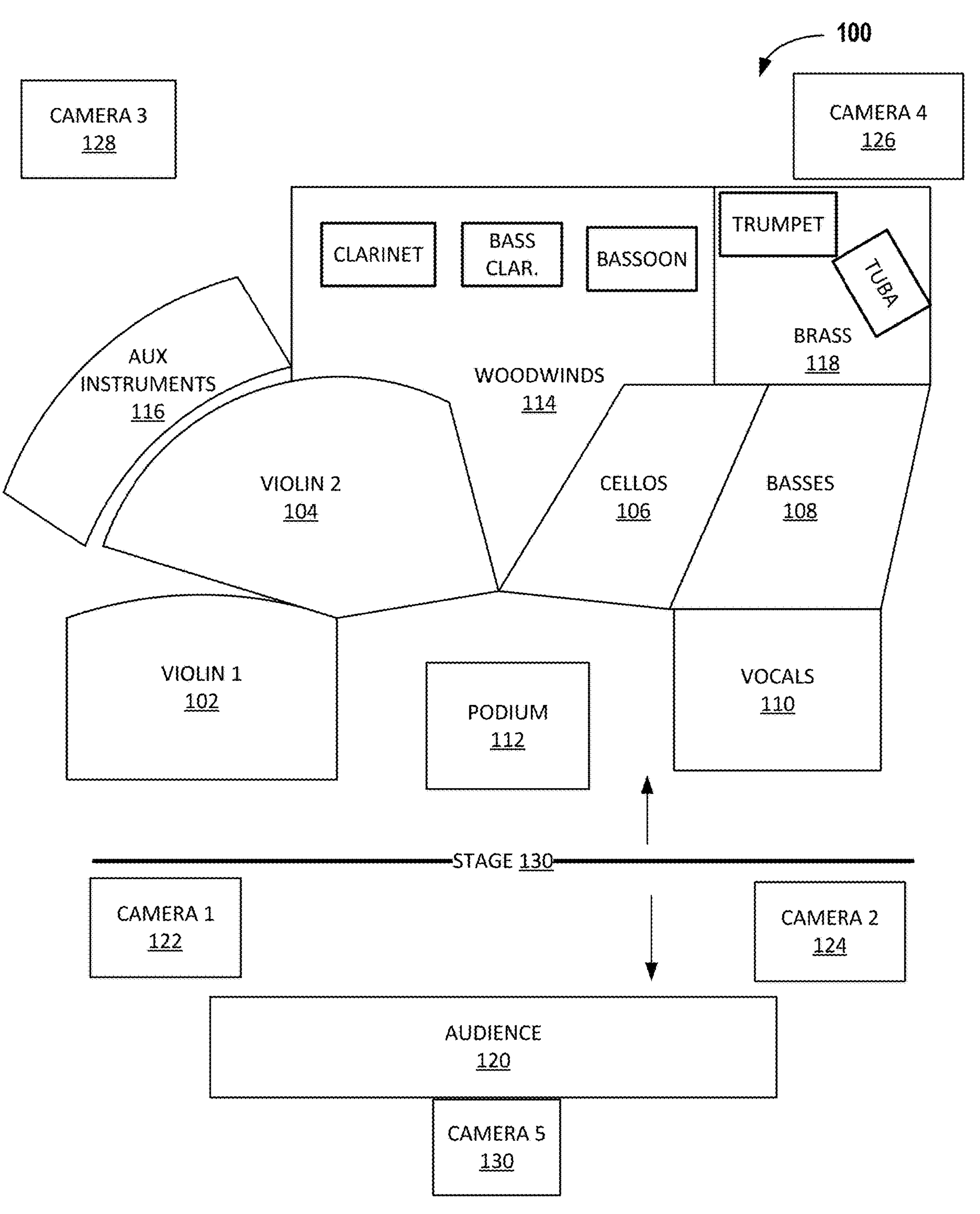
FIG. 1 illustrates an example live environment for camera handling.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Further, the disclosure herein relates in general to camera and devices having cameras, including smartphones, standalone cameras, laptops, notebooks and the like. The reference to one or more camera therefore encompasses such other devices. The disclosure herein addresses handling of such cameras in a live environment, such as during live classical music performances of a piece or a composition. However, the disclosure herein can also be applied to concerts of other music genres having multiple performance and cameras to capture different views of the concert. In an example, the camera handing herein is to address time-based differences, in real-time, between live version of an audio (corresponding to a particular live classical music piece or performance, for instance) and a recorded version (which is also referred to herein as a reference audio recording.

The recorded version may have many differences, such as different interpretations by different conductors, which may be from studio-recording or from a different performance of the same particular classical music piece. The differences from different interpretation may also include different lengths (such as a different total audio length) of the same particular classical music piece. While certain approaches may allow audio recognition using computer-based applications to determine a song by capturing a live version of a song, these are not as to determining time-based differences to enable camera handling. For example, computer-based applications may allow detection of an artist, the musical score, and other related information using parts of a recorded version or even a live version in a live environment, such as from a live performance or an output device, including a radio, a television, or from a human utterance. Certain computer-based applications may, for example, allow recognition of humming or other human utterance to be used to detect the musical score. In contrast, approaches herein determine time-based differences, including using AI/ML, between a recorded version of a musical score (such as a particular classical music piece) and a live version of the same piece, but which may be interpreted differently by a conductor, a soloist or an orchestra, and which may result in a different length of performance, for instance.

A system and method herein can address such deficiencies raised and noted throughout herein by a system and a method on the system for camera handling in live environments. Video production of a live environment (such as a classical music performance or concert) may require a team of trained people and is, therefore, a costly endeavor with an element of uncertainty in its results. The method or system herein can enable a user to direct the concert in advance, such as by using a recorded version of a musical score having associated tags, where the musical score is to be performed in a live environment; by tracking time-based differences; and by using the time-based differences and at least one predominant effect from the tags of the live version to address camera selection (from multiple different cameras) or camera adjustments (change pitch, tilt, or zoom) of one or more cameras in the live environment.

The method or system herein is, therefore, to an automatic approach to enable camera selection or camera adjustments of one or more cameras during a live performance, such as during a concert, which represents the live environment. This approach allows preset directions in tags associated with the recorded version to be modified for use with the one or more cameras. For example, the preset directions may be associated with a recorded version of a musical score. Further, the preset directions may be associated with at least one predominant effect in the musical score, such as to which section (wind instruments section, string instruments section, or percussion section) or which musical feature (rhythm, tone, pitch, timbre, intensity, etc.) of an orchestra is predominant in the recorded version and at what reference moment in the musical score. Then, based in part on input as to where the live version is in a musical score, relative to the recorded version, the preset directions may be used to direct one or more cameras during the live performance.

The method or system herein also allows for initial camera selection and camera adjustments using, for example, at least one predominant effect in a recorded version of a live performance. Whereas, in this approach, the recorded version of the musical score is used to ensure that any time-based difference relative to the live version may be addressed by over-riding the initial camera selection and camera adjustments with further camera selection and camera adjustments from the live version of the live performance or by over-riding the initial camera selection and camera adjustments with default direction-settings for a camera selection or camera adjustments. For example, the default direction-settings for the camera selection or camera adjustments ensures that a view of the conductor is provided if there is an unexplained time-difference, such as a delay or an extended tune in the live version relative to a recorded version of a musical score.

The method or system herein can reduce costs by eliminating intervention by camera operators on-site score reader and art director for each of the one or more cameras and can enable reproducible results in displayed videos for different live performances of a musical score, no matter changes that may occur in a live version. Further, while musicians position themselves on a stage according to a stage plan, the use of multiple cameras can localize the musicians or even sections of the musicians so that a display of the live version of a musical performance matches the stage plan. This at least recognizes the musicians individually and in sections in an effective manner. The camera direction herein allows following of artists or sections, such as when performers move on stage.

The method or system herein includes one or more cameras that can be pointed in a direction associated with the at least one predominant effect, such as a flute solo in a wind section. This, in turn, gives prominence to a flutist and other such individual musicians or sections, when it is needed. Furthermore, the approaches herein not only consider frequency or rhythm to determine at least one predominant effect, but can also use timbre in making such a determination. The method or system herein also incorporates speed improvements with respect to video tracking of a live performance for a display by selecting least time-based differences from multiple recorded versions of the same musical score to be performed in the live environment, for instance.

The method or system herein includes an artificial intelligence/machine learning engine (AI/ML engine) trained to infer tags to be sent to an automatic directing module using a time-based difference determined between a live version and a recorded version of a musical score. The AI/ML engine herein can convert data associated with the live version and with the recorded version of a musical score into numerical vectors. For example, tokenization may be performed to separate the data into portions, such as one or more frames of a musical score. The portions may be further sub-divided. The method or system herein enables tokenization to generate tokens, which generalize a relationship between the data and the tags from the recorded versions to be associated with the data, such as by being communicated to the automatic directing module to enable camera selection and adjustments. As a result of tokenization, a set of unique tags may be generated for the data and may be associated with the tokens.

Further, vectorization may be performed as part of the AI/ML engine. Vectorization of the tokens associated with time-based differences between the live and the recorded versions provides numerical vectors. The numerical vectors may be used with feature selection to determine to retain certain features to be used with assigning tags automatically to time-based differences between a live version and a recorded version of a musical score. The AI/ML engine herein includes storing, at least temporarily, distances between the tokens. Such distances may be used to reduce the number of vectors required and may reduce a need to compare vectors, as part of the AI/ML engine, to add tags to the time-based differences.

In at least one embodiment, a separate AI/ML engine may be used in similar manner to extract features to be used with a frame referencing module to provide the time-based differences between the versions of the musical score. In this case as well, the AI/ML engine for frame referencing herein includes storing, at least temporarily, distances between tokens from a tokenization process. Such distances may be used to reduce a number of vectors required for extracting features and may reduce a need to compare vectors, as part of the AI/ML engine, to determine the features to be used with the frame referencing module.

Further, a live version of a musical score may be analyzed with respect to multiple recorded versions at a same time using such aforementioned approaches. This may be performed using parallel processing to increase robustness and tolerance to various interpretations of a musical score in a live environment. The method or system herein may only require that comparison of an individual vector of one predominant effect (such as tone) to a matrix of the same predominant effect from the multiple recorded versions with each being refenced in the matrix by a reference number. Further, pooling may be used to reduce the matrix size.

A system associated with the method herein includes memory and at least one processor to execute instructions stored in the memory to perform steps in the method. A step in the method includes analyzing audio from the live version (such as from a live audio of a live interpretation of a classical music piece) with a recorded version (such as a prerecorded audio of a different interpretation of the same piece). The analysis is to determine a time-based difference, which may be represented over a period of time. In at least one embodiment, the time-based difference is from at least one frame of each of the live version (live interpretation) against the recorded version (prerecorded interpretation). Further, the time-based difference may be used, along with at least one predominant effect (such as a flutist playing a solo within the classical music piece), to enable camera selection or camera adjustments of one or more cameras during live classical music performances. In this approach it is possible to direct one or more cameras to the at least one predominant effect of a live environment, based on the at least one predominant effect being associated with a recorded version, even if there is time-based difference between where the at least one predominant effect occurs in the recorded version versus the live version of the same classical musical piece.

FIG. 1 illustrates an example live environment 100 for camera handling subject to the descriptions herein. The live environment 100 is illustrated as a classical arrangement for an orchestra, but a live concert of any music genre can benefit from the disclosure herein. The live environment 100 illustrated may be composed of a strings section 102, 104, 106 having at least violins and cellos; a woodwinds (or wind instruments) section 114 having clarinets, bass clarinets, and bassoons, for instance; a brass section 118 having tubas and trumpets that may also be grouped with wind instruments in some instances; percussion (or basses) section 108; a vocal section 110; an auxiliary instruments section 116; and a conductor podium 112. The string section 102, 104, 16 may be a largest section in a classical arrangement for an orchestra. Further, the auxiliary instruments section may include pianos, harps, and other large specialized musical instruments. The orchestra is on a stage 130, the entirety of which may be a live environment.

In the method or system herein, a conductor may use each section differently in different parts of a musical score. Some musical scores may require multiple members of a string section in one part, including specific string sections, such as violins or cellos or a combination. Further, some musical scores may include a combination of multiple sections and may include individual performances in each section. In the method or system herein, there may be multiple cameras 122-130 provided that may be directed to a single section, a single person, or enabled for specific sections of specific people of the live environment. The multiple cameras capture the live environment for a display in real time or records the live environment for display at a later time. Further, the one or more cameras 122-130 may be also directed to an audience or spectators 120.

Figure 2:
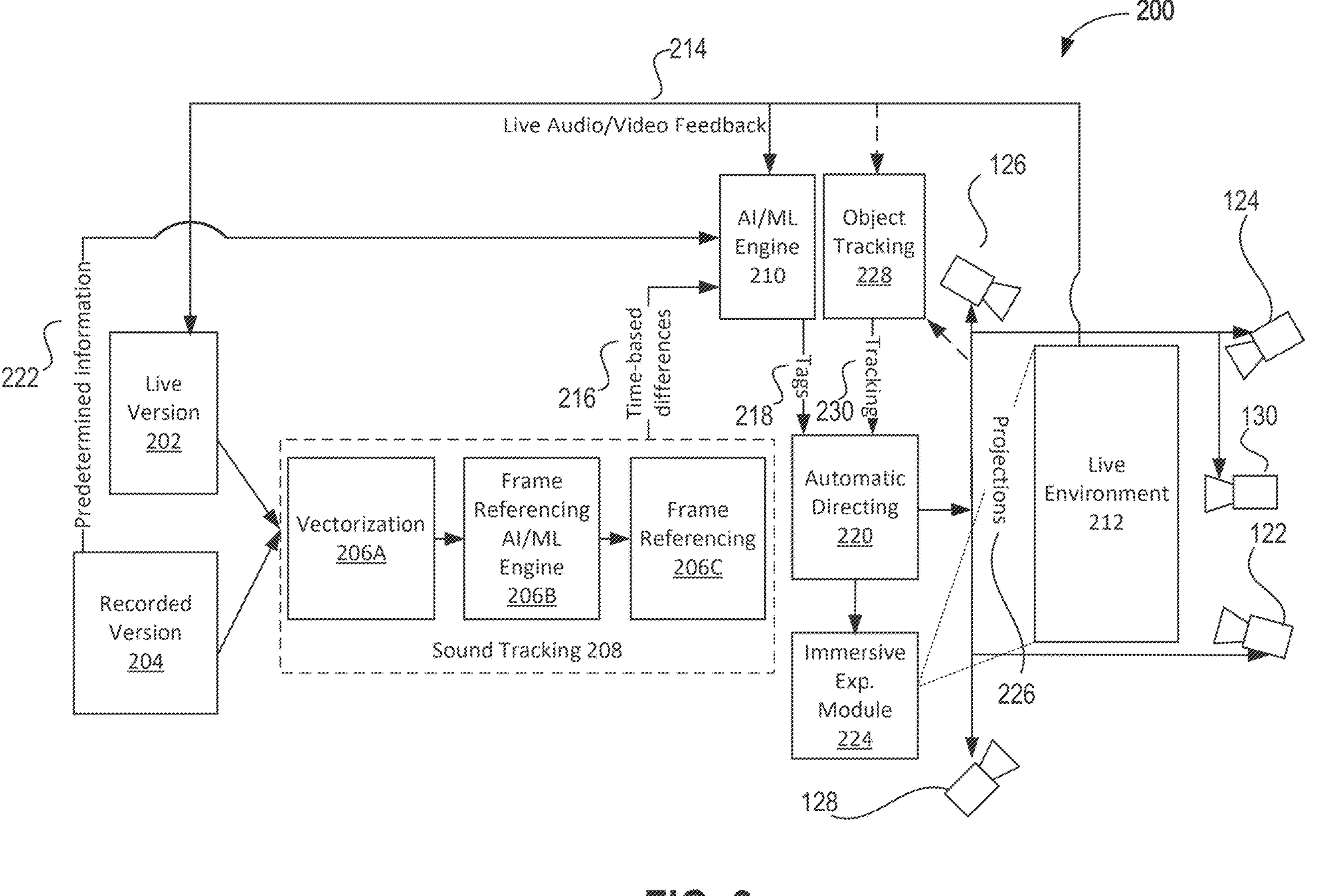
FIG. 2 illustrates an example system for camera handling in live environments.

FIG. 2 illustrates an example system 200 for camera handling in live environments. The system 200 includes at least one processor and memory having instructions to be executed on the at least one processor to perform functions described herein. A further description of such an example system may be apparent in the discussion from FIG. 6 herein. The system includes a live audio/video feedback line 214 to feed live version of a musical score from a live environment 212, through a live version module 202, to a sound tracking module 208. The live version module 202 includes at least memory to provide a live version in real time to the sound tracking module 208.

The system includes a recorded version module 204 to provide recorded versions of the musical score to the sound tracking module 208. Therefore, the recorded version module 204 includes a library of recorded versions of musical scores and predetermined information 222 for each of the recorded versions. The predetermined information 222 may include tags, such as metatags, for predominant effects at various time points or reference moments within the recorded version of a musical score. Further, the recorded version module 204 can also retain live versions of different interpretations of a musical score that will become different recorded versions of the same musical score to offer further robustness to the system 200 herein.

Therefore, the predetermined information 222 may be created and stored with the different recorded versions. In application, the different recorded versions of the same musical score may be used to select one recorded version with a least time-based difference to a live version using the approaches herein. For example, parallel processing may be used to parallelly process at least one frame of each different recorded version with a frame of the live version in real-time. Then, a reliable recorded version (reference audio) may be selected from the different recorded versions based at least in part on a reliability coefficient. In an example, time-based differences may be generated and minimized to a least value, where the least value represents the reliability coefficient. Therefore, one recorded version having a least time-based difference may be selected to have its associated tags used with the live version. Then, the system and method herein may react faster to address the camera selection and adjustments according to the least time-based difference. In the method or system herein, the live version and the recorded version may be provided as digital data in a combined manner to the vectorizing module 206A.

A sound tracking module 208 is able to perform vectorization of the digital data via the vectorizing module 206A implemented by at least one processor. The vectorizing module 206A may also be used to generate vectors based on tokens to be used with the frame referencing AI/ML engine 206B, but may be also used with the tagging-related AI/ML engine 210. The tagging-related AI/ML engine 210 may separately perform tokenization and vectorization of data primarily using the time-based differences 216 determined by the sound tracking module 208. The frame referencing AI/ML engine 206B generates the features from one or more of the recorded version or the live version of a musical score. The features are provided to the frame referencing module 206C.

The frame referencing module 206C of the sound tracking module 208 performs frame referencing using an appropriate algorithm, such as using online dynamic time warping (ODTW). The frame referencing module 206C provides time-based differences 216 from an output of the sound tracking module 208 to the tagging-related AI/ML engine 210, which then infers or predicts the tags 218 to be provided to the live version in real-time. The tagging-related AI/ML engine 210 can learn how to tag a live version based in part on the time-based differences 216 between a recorded version and a live version of a musical score and based in part on tags from the predetermined information 222. The tagging-related AI/ML engine 210 can then associate those tags, from the predetermined information 222 of the recorded version, with frames of the live version according to the with time-based differences 216.

The tags 218 may be provided to an automatic directing module 220 to identify at least one predominant effect (such as a flutist solo) of a recorded version of the musical score that is also in the live version of the musical score. The tagging-related AI/ML engine 210 can inform these tags 218 to the automatic directing module 220, taking into consideration time-based differences between the live and the recorded versions of the musical score. For example, an initial time-based difference (such as a 2 second delay) may be learned after the start of the live version and the tagging-related AI/ML engine 210 may project the tags 218 from the predetermined information 222 to the rest of the live version, as it occurs, so that cameras can 122-130 can be properly directed in future time points as well as instantaneously.

Further, the tagging-related AI/ML engine 210 can beneficially account for on-going time-based differences as the live version continues. The tagging-related AI/ML engine 210 may be therefore trained using the time-based differences to infer or predict further points in the live version corresponding to the recorded version so that tags may be informed to the automatic direction module 220 in expectation of those points upcoming in the live version. As the live version may have further time-based differences, the tagging-related AI/ML engine 210 is able to update the tags 218 for those points as the time-based differences changes. The tagging-related AI/ML engine 210 may be also used to create tags based on provided predetermined information 222. These tags 218 may be a combination of one or more tags from the predetermined information 222, for instance. The tags 218 can be translated into specific camera presets in the automatic directing module 220, which can send signals to one or more cameras for the selection or adjustments described throughout herein. In one example, an NN of the tagging-related AI/ML engine 210 receives predetermined information 222 that may include a stage plan, and metadata (with tags) predetermined and associated with the recorded version.

Therefore, a tagging-related AI/ML engine 210, once trained, can infer the tags 218 to be associated with future points in one or more frames of a live version of the musical score. The tagging-related AI/ML engine 210 communicates the tags 218 to the automatic directing module 220. The tags allow the automatic directing module 220 to signal one or more cameras 122-130. The signal is to enable camera selection or camera adjustments of the one or more cameras 122-130 in the live environment. A live version of the musical score can be analyzed frame-by-frame by the sound tracking module 208 and the tagging-related AI/ML engine 210. The time-based differences 216 are communicated to the tagging-related AI/ML engine 210 for each received frame of a live version analyzed against one or more frames of one or more recorded versions of the musical score in the live environment.

A recorded version module 204 includes predetermined information 222 indicating at least one predominant effect in a musical score. Then, when a time-based difference 216 is determined (such as a delay, a slower tempo, etc.), this predetermined information 222 may be passed to the tagging-related AI/ML engine 210. The tagging-related AI/ML engine 210 uses this predetermined information 222, along with time-based differences 216 that are provided from the frame referencing module 206C to determine the tags 218 to be informed to the automatic directing module 220. The tags 218, communicated to the automatic directing module 220, allows this module 220 to select or adjust one or more cameras 122-130 in a live environment to point in a direction associated with at least one predominant effect, using the time-based difference from the frame-by-frame analysis. Therefore, the direction occurs instantaneously or in an expected manner as the tags 218 can include future tags for a predetermined time forward of a current point in the live version. As such, the system 200 is able to determine a delay or change in rhythm of a live version of a musical score, is able to determine at least one predominant effect that is delayed, that is faster, or that is different in other manners, than the recorded version, and is able to select or adjust at least one camera to address the at least one predominant effect.

The method or system herein includes feature extraction for a live or recorded version that may be performed in the frame referencing AI/ML engine 206B that is different from the tagging-related AI/ML engine 210 that is associated with the tagging approaches described herein. The sound tracking module 208 may include the frame referencing AI/ML engine 206B for feature extraction. For example, the frame referencing AI/ML engine 206B may include an auto-encoder to perform such feature extraction. For example, an auto-encoder may be a Vector Quantized Variational Auto-encoder (VQ-VAE). The VQ-VAE tries to find a latent space (such as variables) that has an underlying representation in provided data, such as data associated with the live or recorded version. The VQ-VAE maps, from received digital data, a live version and a recorded version in a frame-by-frame manner, performs tokenization as described elsewhere herein, and then provides vectors associated with the tokens. The tokenization may be represented by indices of embeddings. Approaches herein can use VQ-VAE with ODTW to select features and to determine the time-based differences using those features.

The frame referencing AI/ML engine 206B may be provided with the embeddings that are stored so that comparison of vectors need not be performed to learn the features to be used with the ODTW algorithm. Separately, a similar approach may be performed for the tagging-related AI/ML engine 210, which can learn how to tag the live version based on the time-based differences and based on tags from the recorded version, and which can provide the tags to be informed to an automatic directing module 222. The frame referencing AI/ML engine 206B and the tagging-related AI/ML engine 210 can be periodically updated as an average of recently tokenized data. The method or system herein may use moving averages in one approach. Further, the frame referencing AI/ML engine 206B may be trained to infer differences between the live version and the recorded version of a musical score. The tagging-related AI/ML engine 210 is used to infer the tags to be informed to the automatic directing module 220.

A neural network (NN) of the tagging-related AI/ML engine 210 may learn from the time-based differences of the sound tracking module 208 to dynamically align an input layer to weights within the NN for described tags available to it. Further, the frame referencing AI/ML engine 206B may be dynamically updated in a similar manner to dynamically align an input layer to weights within its NN for described features of the audio versions. The tags 218 may be defined to be used with different predominant effects or may be generated by an adversarial neural network. For example, a discriminator of such an adversarial neural network may be trained to classify forced variations of the recorded versions, where a generator is used to generate the forced variations. The forced variations may have specific predominant effects of known tags from the predetermined information 222 that are informed post-training to the discriminator. The specific predominant effects are therefore auto-tagged in this approach or tags may be generated to be used with an NN of the tagging-related AI/ML engine 210.

The weights for the NN of the tagging-related AI/ML engine 210 updates according to the time-based differences and may be used with neuron of a subsequent layer. For example, where the ODTW analysis indicates no difference between the versions, the weights of an NN are unchanged and no tags may be assigned or informed by the NN as the frames of the live version of the musical score are processed in the AI/ML engine 210. This may be a feed-forward approach for the NN of the tagging-related AI/ML engine 210. For differences noted by the ODTW analysis, the NN may be skewed to cause an output identifying at least one tag to be associated with the difference and may be associated with a predominant effect in the live version or the recorded version. Therefore, time-based differences in the versions may be addressed and tagged automatically without the need to address specific predominant effects in the live version relative to the recorded version.

Therefore, in FIG. 2, system 200 may include the at least one processor as part of the automatic directing module 220, the tagging-related AI/ML engine 210, and/or the immersive experience module 224. The at least one processor can perform a determination that at least one frame of a live version 202 of a musical score being performed in a live environment 212 corresponds to a recorded frame of a recorded version 204 of the musical score. Then, at least one camera 122-130 can be enabled to perform a camera movement that is according to a time-based reference, including a time-based difference 216, that is between the at least one frame and the recorded frame and that is according at least one predominant effect of the recorded version 204 or the live version 202.

Further, in FIG. 2, the predominant effect is in a form of an instruction that is stored in the memory that is associated with the at least one processor or in a distinct memory so that the recorded version 204 of the musical score may be accessed from such a memory. The instruction may be executed by the at least one processor. Further, these instructions for the predominant effect may be distinct from the instruction for the functions performed at the at least one processor to determine the at least one frame and to perform a camera movement. The instruction associated with the predominant effect may include, for the at least one frame, at least a first instruction for at least one of a musical performer to be captured by the at least one camera 122-130 using the camera movement or may include at least a second instruction for a type of immersive experience to be generated and captured by the at least one camera 122-130. In addition, further steps or functions to be performed by the at least one processor, such as of the automatic directing module 220, include enabling the camera movement to capture the musical performer or the immersive experience; and incorporating or including the camera movement with the live version 202 of the live environment 212.

In a further example, using the system 200 in FIG. 2, the instruction for the predominant effect may be enabled to be provided in a computer-based input. For example, a character or graphical user interface may be used to receive the computer-based input using at least one component in system 600 in FIG. 6. The predominant effect provided in the computer-based input may be based on the recorded version 204 of the musical score. In an example, the immersive experience is generated for the at least one frame of the live version 202. Further, the immersive experience may be a type that is at least one of a graphical visualization 452, in FIG. 4B, for instance, being displayed during the live performance, or text 454 being displayed to the audience of the live performance. For example, the automatic directing module 220 provides input to an immersive experience module 224 to cause projections 226 and other forms of immersive experience features to provide the graphical visualization 452 or the text 454. While illustrated to a section-specific view 410 (of the percussion section 410), the immersive experience may be provided in any part of the live environment 212/402 itself.

The system 200 also supports adjusting, dependent on features derived from audio and video of the audio/video feedback line 214 of the live performance, the camera movement or the immersive experience. For example, such features may include at least one of a volume or a level of expression of emotions of the musical performer. The adjusting may include at least one of camera zooming associated with the at least one camera 122-130 or tuning of colors of the graphical visualization 452 or text 454. In one instance, the level of expression of emotions of the musical performer may be determined based at least in part on an object tracking AI/ML algorithm of an object tracking module 228 that tracks 230 a facial matrix of the musical performer in the live version of the musical score. This AI/ML algorithm may be distinct from the frame referencing AI/ML engine 206B or the tagging-related AI/ML engine 210. The object tracking AI/ML algorithm may be trained with facial matrices for different expressions of emotions. The object tracking AI/ML algorithm may be able to determine the different expressions of emotions for the musical performers by receiving a facial matrix that is filtered (or processed in any manner to extract facial detail) from a capture of one musical performer and by classifying the facial matrix to at least one of the different expressions of emotions, for instance.

In one aspect, the adjusting of the camera movement or the immersive experience is further based in part on object tracking 230 preformed for the live version 202 of the musical score. For example, the live version 202 may be subject to input to the object tracking module 228 and, may allow for faster processing in near real time, than in real time. This may be as result of additional one or more of video processing steps already performed for the live version in the audio/video feedback line 214, than the live version captured in real time. For example, the object tracking module 228 may need to perform additional processing when capturing the live environment 212 directly. This is illustrated by the broken lines to the object tracking module 228, for instance.

In addition, the system 200 includes enabling the camera movement using multiple ones of the at least one camera 126, 128. For example, the camera movement includes particular actions performed on particular ones of the at least one camera 122; 124; 126; 128; 130 such as to provide the section-specific views 406-414 that include views of the string instruments section 408, the wind instruments section 414, and the percussion section 410. The camera movement can be modified in real time based at least in part on determination of a problem with the at least one camera or a further camera associated with the at least one camera. For example, if a camera is not working, the automatic directing module 220 is able to utilize the remaining to compensate for loss of a view of the section-specific views 406-414.

The system 200 also supports determining, for the at least one frame of the live version of the musical score, the recorded frame of the recorded version of the musical score based on the frame-referencing AI/ML engine 206B, which can be used to extract features describing the at least one frame of the live version 202 and the record frame of the recorded version 204. The frame-referencing AI/ML engine 206B may use online dynamic time warping (ODTW) to determine associations between the audio features.

One or more of the AI/ML engine 210 herein may be based at least in part on feedback provided by users. For example, feedback may be collected via a computer-based input and where the feedback includes mistakes in the frame matching. The users may remotely provide such computer-based input using hand-held devices described in connection with FIG. 6, for instance. The feedback may be added to a training data set for AI/ML engine 210. The system herein enables any of the AI/ML algorithms herein, such as in the illustrated modules 206B, 210, 228 of FIG. 2 to use outcomes from previous live performances of the musical score. For example, the recorded frame determined using the at least one frame enables consecutive frames matches between the live version and the recorded version.

Any of the AI/ML algorithms herein can use a degree of confidence, wherein a first predetermined value of the degree of confidence allows the AI/ML algorithm to influence the camera movement by one or more of switching to other types or settings of predominant effects or keeping the at least one camera 122-130 or a plurality of cameras in a switched mode until the machine learning algorithm regain a second predetermined value of the degree of confidence for next frames of the live version or the recorded version of the musical score. The switching herein may include at least one of redirecting the at least one camera 122; 124; 126; 128; 130 or two or more cameras 122-130 to capture a conductor of the musical score or to reduce effects associated with the at least one predominant effect based on an immersive experience associated with the live version of the musical performance.

Any of the AI/ML algorithms herein can take a form of an ensemble of models. This is such that each model in the ensemble takes, as input, either the same or a different set of features extracted from an audio signal of the audio/video feedback line 214. Each of these ensemble of models may apply ODTW separately. Separate outputs of the ODTW procedures of each of the ensemble of models may be synthesized together and a degree of confidence may be computed for the synthesized output. The synthesized output of the two or more ensemble of models may be an average of the outputs. In one example, the degree of confidence may be based in part on a comparison of whether outputs of two or more of the ensemble of models are different from each other. Further, if all or almost all of the outputs are the same (or similar, according to predetermined variation, for instance), then a degree of confidence for the two or more of ensemble of models is equal or almost equal to the maximum value, such as a value of "1."

In a further example, the more distinct the outputs are from each other of the two or more ensemble of models, the more likely a determination of a lower degree of confidence can be made. Still further, when a degree of confidence is too low, with respect to a pre-determined value (also referred to herein as a confidence acceptance threshold) that may be subject to manual or automatic tuning, then the ensemble of models may report an issue of certainty about its output. This may cause the system 200 to operate in an error scenario, where it performs a safety operation, such as to provide the default direction-settings that captures the conductor, the audience, or a general orchestra view, instead of single musicians. This safety operation may be in place till the ensemble of models begin to deliver outputs with a degree of confidence over the pre-determined value.

Figure 6:
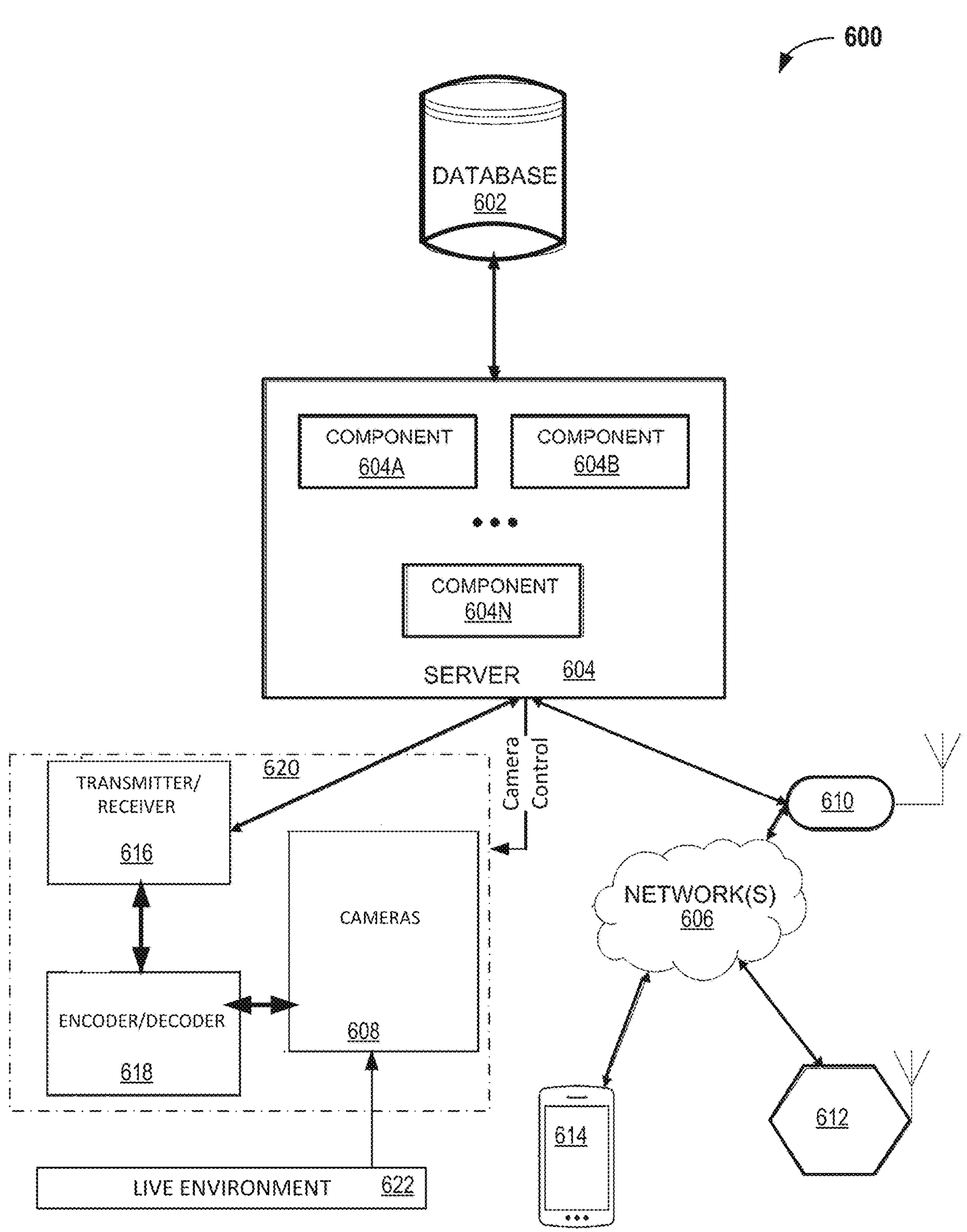
FIG. 6 illustrate a further example system for camera handling in live environments.

The recorded versions 204, one of which is illustrated in FIG. 2, may be of different versions of the musical score that, along with associated predominant effects, may be stored in the system 200 (and/or system 600 of FIG. 6). The recorded version may be determined from multiple recorded versions to be used with the live version at a beginning of the musical score. This determination may be based in part on a difference, such as time-based difference 216 that is part of the time-based reference between the at least one frame and individual ones of the recorded frames of the recorded versions.

In an example, a recorded version of the multiple recorded versions may be determined as the one to be used with the live version of the musical score based in part on a degree of confidence with which an AI/ML algorithm, such as one or more of the frame referencing AI/ML engine 206B or the tagging-related AI/ML engine 210, provides an output using the at least one frame against the plurality of recorded frames. For example, one or more of the frame referencing AI/ML engine 206B or the tagging-related AI/ML engine 210 may be responsible for determination of the recorded frame associated with the at least one frame and may be responsible to make such a determination by providing a degree of confidence. The degree of confidence may be taken along with the determination of the recorded frame to determine if to keep or change the recorded frame. Although the determination of the recorded frame is made, the degree of confidence provided may be lower than a pre-determined value. As such, the determination of the recorded frame to be used may be rejected for another recorded frame of a different recorded version of a higher degree of confidence with respect to the predetermined value and that is to be used with the live version.

The system 200 includes using the automatic directing module 220 to enable the camera movement for the at least one camera or cameras 122-130 using preliminary instructions until the recorded version is determined with a pre-determined value of a degree of confidence. The determination of the recorded version may be performed in real time or in near real time using a scalable cloud environment, such as the system 600 in FIG. 6 and using multiple recorded versions available in the system 600. Then, information associated with the recorded version can be sent to the at least one camera or to multiple cameras 122-130. The system 200 further supports enabling an additional real time determination of another recorded frame to be used with the live version, by one or more of the frame referencing AI/ML engine 206B or the tagging-related AI/ML engine 210, using an edge environment that is associated with the scalable cloud environment, such as the system 600 in FIG. 6.

Further, the system 200 supports capturing of the live version using the at least one camera or the multiple cameras 122-130 in a manner that is synchronized, in real time, with live audio, such as via the feedback feature 214 provided. The synchronized capture can be used in at least one of an online broadcasting, a television-based live entertainment production, or a production of a musical score recording. Therefore, the camera movement is enabled to obtain different live versions of the musical score for different reproduction, such as for the online broadcasting, the television-based live entertainment production, or the production of the musical score recording.

Figures 3A, 3B:
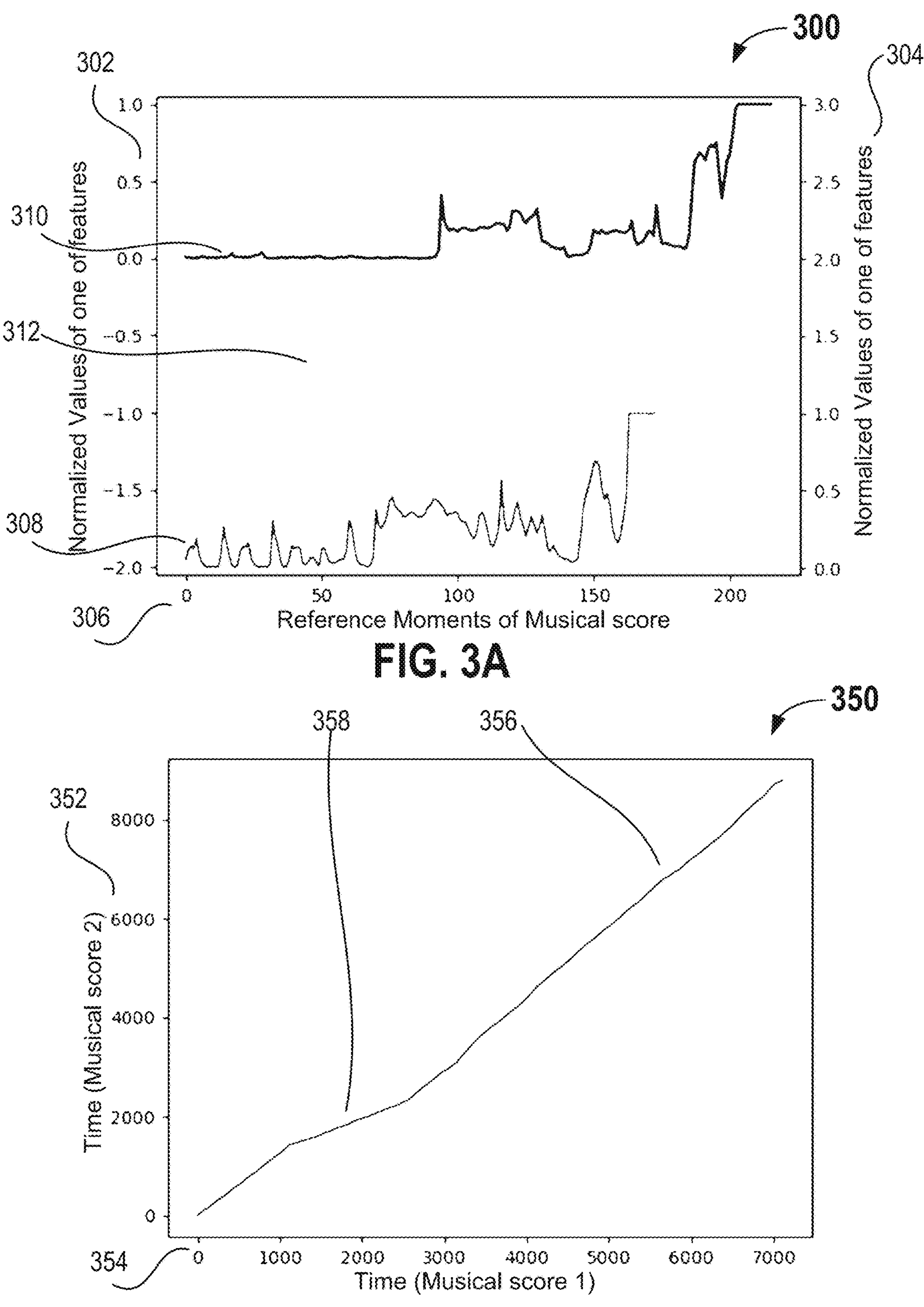
FIGS. 3A and 3B illustrate example plots associated with a method and system for camera handling in live environments.

FIGS. 3A and 3B illustrate example plots 300, 350 associated with camera handling in live environments of at least one embodiment herein. The method or system herein include Dynamic Time Warping (ODTW) to perform a nonlinear normalization for time between at least two frames of versions of a musical score. Further, ODTW works optimally to provide at least a sum of distance values of index pairs that are aligned or ordered in a sequence, for instance. ODTW provides a static measure that may benefit from optimization to the alignments or orders therein. This may be part of a dynamic programming performed in ODTW. For example, ODTW compares numerical representations of a live version to stored recorded versions.

In the examples herein, the recorded and the live versions of the musical score and received as numerical representations of the musical score. The numerical representations of the versions may rely on specific coefficients, such as chroma features, cepstral coefficients, Mel Frequency Cepstral Coefficients, or perceptual linear prediction (PLP) coefficients. Further, feature extraction, via the frame-referencing AI/ML engine, uses pattern comparison by searching for a representation between the versions of the musical score. FIG. 3A illustrates a plot 300 of coefficients of a frame of a recorded version 308 against a live version 310 over time 306, which represents reference moments of a musical score. Further, the plot 300 illustrates y-axis 302, 304 as having normalized values of a musical score for the recorded version 308 and the live version 310, including to at least one effect that may be used to determine a predominant effect in the recorded version, for instance. Further, a mapping 312 is illustrated between the versions 308, 310 and represents time-based differences in the versions.

The method or system herein utilizes ODTW to minimize a distance between the different coefficients at one or more time points 306. For example, approaches herein minimize a distance between coefficients (points in each line 308, 310), for one or more time points 306 by copying and matching each of such points. Further, a sliding window may be defined and used with each point of the live version 308 against all points in the sliding window of a recorded version 310. A cost function of the ODTW is used to determine costs between such points.

Further, minimizing of the cost function may be used to determine the distance (and a least distance) between an initial point to a current point in the sliding window. This is similarly performed for the initial point to a matched point of recorded version 308. The cost functions having cost values for a final point on a sliding window can be obtained and then a minimum distance between the versions may be defined using the cost values from matching the final points between the versions in the sliding window till the end of the frame in the frame-by-frame analysis. As the recorded version is known relative to the live version, an estimated starting time may be used and distance between points in the lines of the versions 308, 310 may be determined. The distance may be minimized in each frame to determine where the points of a live version are supposed to be relative to the recorded version, with the time information associated with the x-axis used to define time-based differences. Furthermore, one frame may be used in a subsequent frame analysis as a time-based difference may carry over through an entire musical score.

In the example plot 350 associated with camera handling in live environments, the minimized differences and the time-based differences between the versions of the musical score are provided for illustrative purposes. The method and system herein process numerical representations without generating such plots. For example, the x and y-axis 352, 354 in the plot 350 are associated with ranges for a sequence of coefficients used in the ODTW analysis of the versions of the musical score. The ranges may be approximately the same. In the plot 352, a proportional linear section 356 implies a match between the versions, while any skew 358 represents a contraction or expansion with respect to time-based differences between the versions for at least one frame.

Figure 4A:
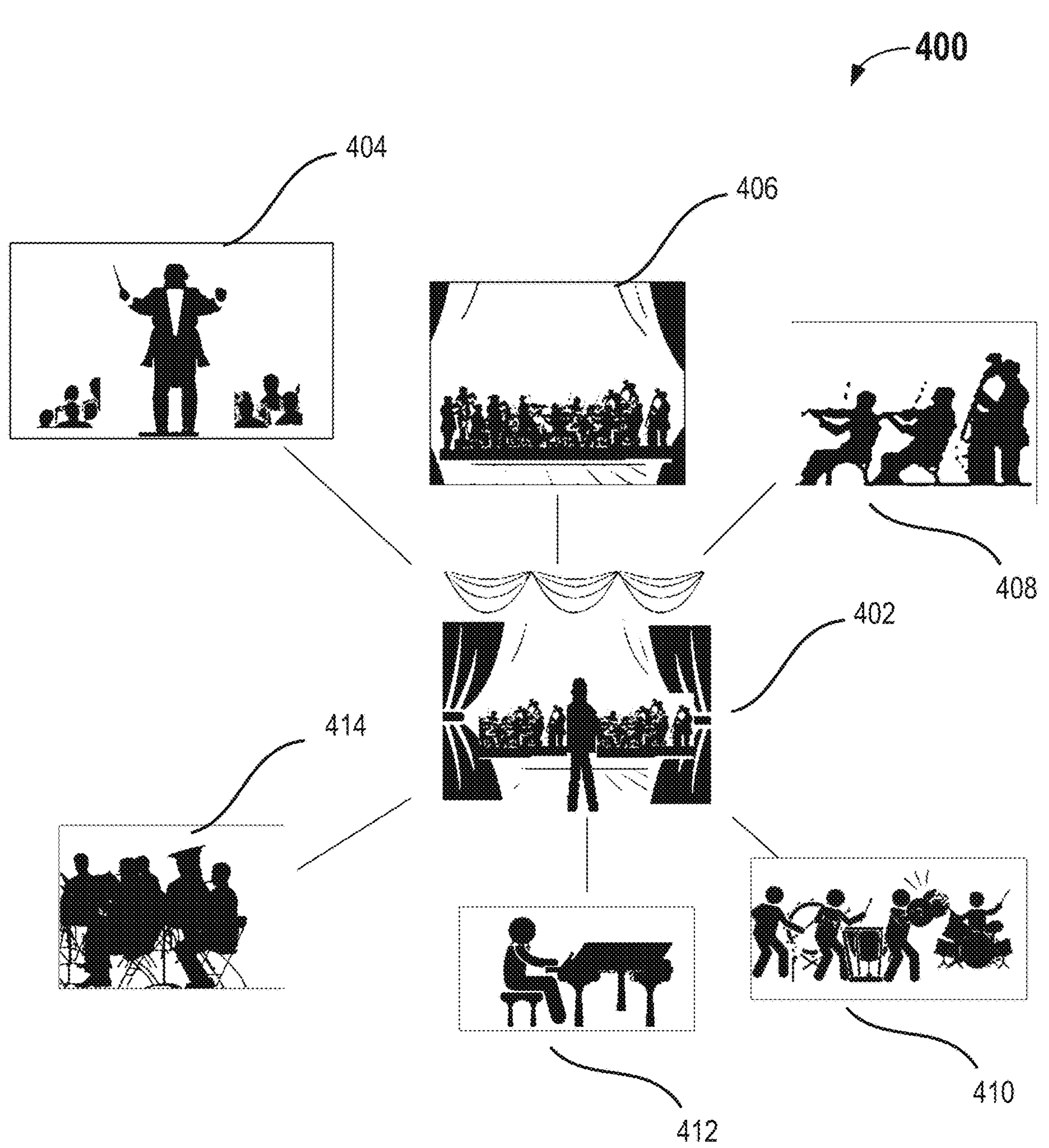
FIG. 4A illustrates views from camera handling in live environments where one or more cameras are selected or adjusted in the live environment to be pointed in a direction associated with the at least one predominant effect.

FIG. 4A illustrates exemplary camera handling 400 in live environments where one or more cameras are selected or adjusted in the live environment to be pointed in a direction associated with the at least one predominant effect, according to at least one embodiment herein. For a live environment 402, at least one camera provides a default view 404 and multiple section-specific views 406-414. The section-specific views 406-414 include views of the string instruments section 408, the wind instruments section 414, and the percussion section 410. Further, if one camera is used for two of the views 404; 406-414, then the one camera can be subject to adjustments using the time-based difference and the at least one predominant effect. Multiple cameras, however, enable selection and adjustments using the time-based difference and the at least one predominant effect. Further, the one camera is at least selected by the requirement to make an adjustment, such as to pan, tilt, or zoom to focus on one or more subjects of the live environment 402.

The method or system herein allows for initial camera selections and camera adjustments using, for example, at least one predominant effect in a recorded version of a live performance. These initial camera selections and camera adjustments may be to provide views, as illustrated, to a viewer on a display screen or to be recorded with the live version of the musical score. The recorded version of the musical score is used to ensure that any time-based difference relative to the live version may be addressed by over-riding the initial camera selection and camera adjustments with further camera selection and camera adjustments from the live version of the live performance or by over-riding the initial camera selection and camera adjustments with default direction-settings, such as to a default view 404, for a camera selection or camera adjustments. For example, the default direction-settings for the camera selection or camera adjustments ensures that a view of the conductor is provided if there is an unexplained time-difference, such as a delay or an extended tune in the live version relative to a recorded version of a musical score.

Figure 4B:
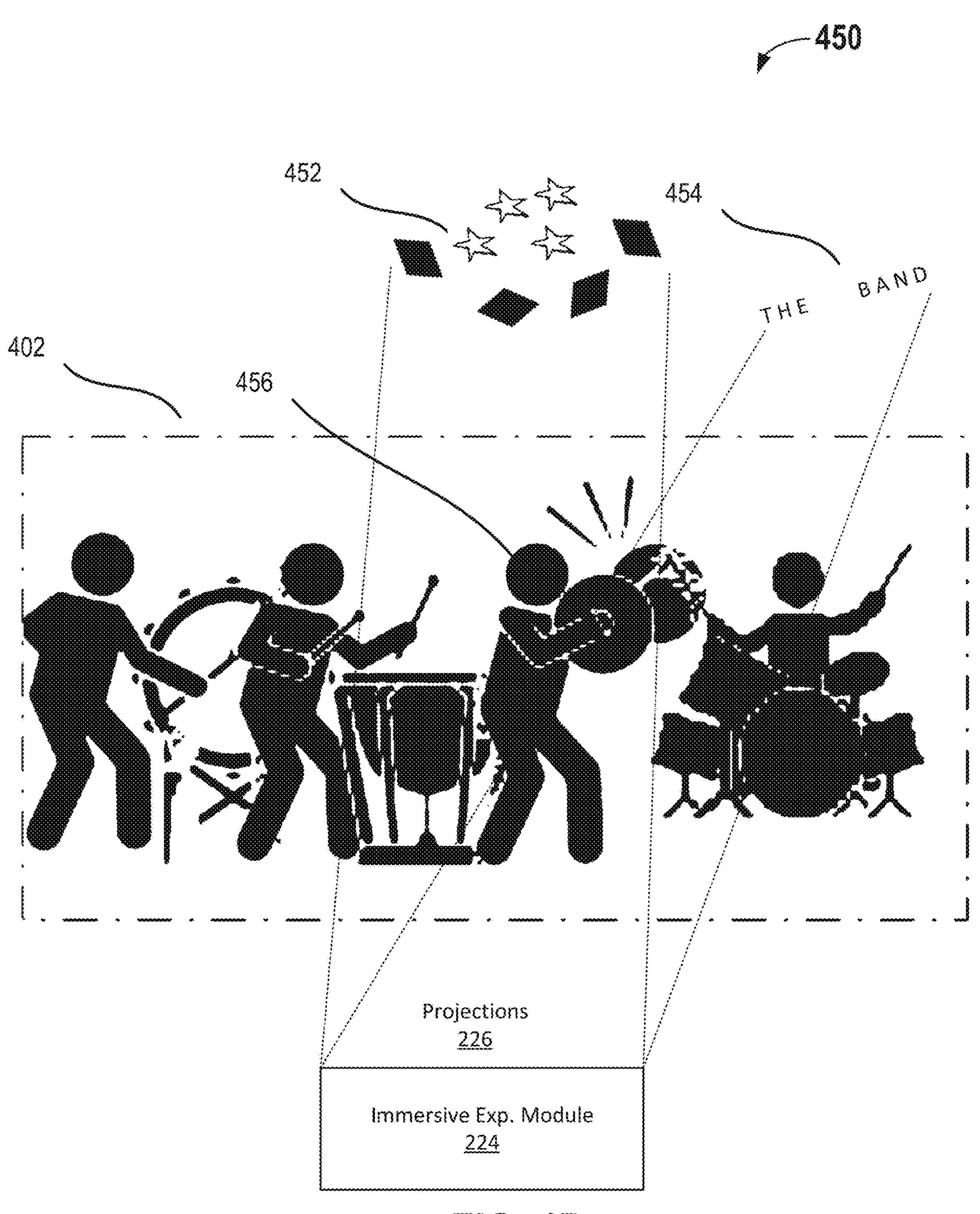
FIG. 4B illustrates aspects associated with immersive experiences in live environments based in part on tracking a live version of audio in a live environment.

FIG. 4B illustrates aspects 450 associated with immersive experiences 452, 454 in live environments based in part on tracking a live version of audio in a live environment. For example, a camera may be automatically directed to an object 456 (such as, to a particular musical performer) and may provide the immersive experiences 452, 454, in real time, using a provided immersive experience module 224. The musical performer 456 may be expected to move in time relative to the live version being performed. In one example that benefits the immersive experiences 452, 454 herein, the system 200, using its object tracking module 228 and cameras 120-130, can track the musical performer 456 to provide the immersive experiences 452, 454. However, when the object tracking module 228 loses the musical performer 456, the system 200 can switch to another operation scenario associated with camera handling, as a backup, but can keep the immersive experiences 452, 454 ongoing using the immersive experiences module 224.

In another example, the object tracking module 228 may include emotion detection for expressions of emotions of the musical performer 456. Outputs tied to the expressions of emotions may be used to provide additional ones of the predominant effects that influence camera handling. For example, zooming in or out at least one of the provided camera 122-130 may be based on the detected expressions of emotions of the musical performer 456. Further, the switching of the camera handling to a default direction-settings may be performed when expressions of emotions of the musical performer 456 are negative.

The system 200 may be also integrated with different types of presentation or display media software. For example, the immersive experience module 224 may be able to provide the graphical visualization 452 and the text 454 (such as, "THE BAND" reflecting words, lyrics, names, etc.) but may include any other software used to generate immersive experiences that are other than the graphical visualization 452 and that are other than the text 454. Further, the graphical visualization 452 may move with the musical performer 456 and/or the audio of the live version, and may include three-dimensional (3D) visuals, faces, images, cartoons, and other virtualizations. Therefore, the graphical visualization, text, or any other forms of displayed media of the immersive experiences herein may be in synchronization with one or more of live audio and live video from the live environment. The displayed media can be varied depending on features derived from the live audio. For example, during a live performance, when a specific predominant effect occurs, a graphical visualization software of the immersive experience module 224 that is connected to a display screen of the live environment 212 can project a corresponding graphical visualization onto the display screen or through augmented or virtual reality devices used with the system 200.

Figures 5A, 5B:
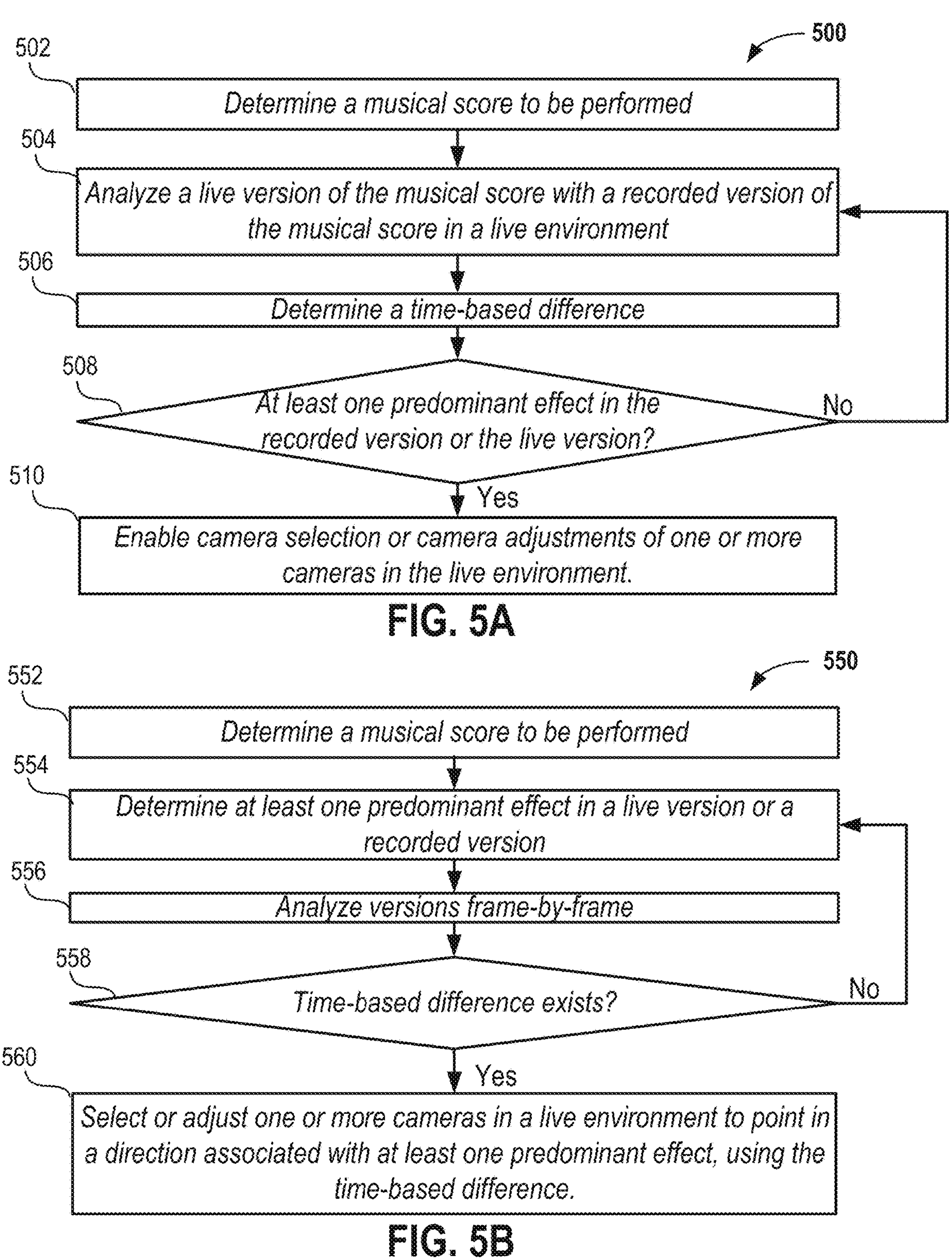
FIG. 5A illustrates an example method for camera handling in live environments.
FIG. 5B illustrates another example method for camera handling in live environments.

FIG. 5A illustrates an example method 500 for camera handling in live environments. The method 500 includes determining (502) a musical score to be performed. Once the performance beings, the method 500 includes analyzing (504) the live version of the musical score with a recorded version of the musical score in the live environment. The analyzing (504) may include ODTW approaches described throughout herein. For example, the analyzing (504) can include determining, by at least one processor, that at least one frame of a live version of a musical score being performed in a live environment corresponds to a recorded frame of a recorded version of the musical score. Time-based differences are determined (506) from the analysis in step 504. Further, a verification (508) may be performed that at least one predominant effect is in the live version or the recorded version.

A predominant effect may be predetermined and may be associated with the recorded version. For example, solos from a member of an orchestra, performance from a specific section, and other such aspects may be a predominant effect that requires camera focus on the member or the specific section. However, time-based differences between the live and recorded versions of a musical score may change when the predominant effect occurs for a live version of the musical score. The time-based differences form the basis for an AI/ML engine to provide tags to enable (510) camera selection or camera adjustments of one or more cameras in the live environment. For example, at least one processor uses the tags to determine one or more cameras to be selected or adjustments to be made to one or more cameras. For example, the enabling (510) step may be performed using the at least one processor and/or by at least one camera. The enabling (510) step may be to a camera movement that is according to a time-based reference between the at least one frame and the recorded frame and that is according at least one predominant effect of the recorded version or the live version.

FIG. 5A further illustrates an example method 500 for camera handling in live environments. The method 500 includes determining (502) a musical score (such as a musical piece) to be performed. Once the performance begins, method 500 includes analyzing (504) the musical piece performed live against a recorded version (such as a reference musical piece) in the live environment. The analyzing (504) may include ODTW approaches described throughout herein. Time-based differences are determined (506) from the analysis in step 504. Furthermore, a predominant effect in a live version may be in the form of a delay or other change in the live version relative to the recorded version. Approaches herein cause a default view, such as to select a camera pointed to a conductor or to zoom, pan, or tilt a camera to the direction of the conductor for such a predominant effect in the live version of the musical score.

FIG. 5B illustrates another example method 550 for camera handling in live environments. The method 550 may be alternative to the method 500 in FIG. 5A at least because the method 550 in FIG. 5B causes camera changes. For example, the method 550 in FIG. 5B includes determining (552) a musical score to be performed. Once the performance beings, the method 550 includes determining (554) at least one predominant effect in a live version or a recorded version of the musical score. The method 550 further includes analyzing (556), frame-by-frame, the live version of the musical score with the recorded version of the musical score in the live environment. The analyzing (556) may include ODTW approaches described throughout herein. A verification (558) may be performed for time-based differences determined from the analysis in step 556. Further, the method 550 includes selecting or adjusting (560) one or more cameras in a live environment to point in a direction associated with at least one predominant effect, using a time-based difference from the frame-by-frame analysis of step 556. The system 200; 600 herein supports turning on or off at least one function associated with the processor-implemented method 500; 550, using a computer-based input, that reports at least one aspect of the musical score. For example, the at least one function that can be turned on or off is to control a level of automation of camera movement.

FIG. 6 illustrates another example system 600 for camera handling in live environments. The system 600 may include computer and network aspects to perform all of part of the features described in at least FIGS. 2, 3, 5A, and 5B. These computer and network aspects 600 may include a distributed system. A distributed system 600 may include one or more computing devices 612, 614. One or more computing devices 612, 614 may be adapted to execute and function with a client application, such as with browsers or a standalone application, and are adapted to execute and function over one or more network(s) 606.

In at least one embodiment, a computing device herein can be a unit of a system to perform some part of features described herein, such as vectorization. However, such a computing device may include a smartphone to perform at least part of such features described herein. For example, a smartphone having a camera can be used instead of a camera to receive information about direction, such as adjustments or direction to point the smartphone. There may be different types of devices capable of being selected or adjusted for the camera handling described throughout herein, including devices for recording after it is registered to be used for the system herein, in one example. Moreover, as certain live environments may involve movement with one or more artists, it is beneficial that other audience/spectators may be brought into the system to have their cameras incorporated by instructions sent to their smartphone. The directions instruct at least adjustments to enable their smartphones to be used for directing in the live environment.

Further, a server 604, having components 604A-N may be communicatively coupled with computing devices 612, 614 via network 606 and via a receiver device 608, if provided. Components 612, 614 include processors, memory, and random-access memory (RAM). A server 604 may be adapted to operate services or applications to manage functions and sessions associated with database access 602 and associated with computing devices 612, 614. A server 604 may be associated with one or more cameras 608 of a system 620 for camera handling in live environments 622.

An encoder/decoder 618 and transmitter/receiver 616 may be associated with the system 620 to allow remote monitoring and control of aspects of camera handling in live environments. An encoder/decoder 618 and transmitter/receiver 616 may include a processor and memory having instructions that when executed by the processor can cause the encoder/decoder 618 and transmitter/receiver 616 to perform collective perform encoding/decoding and transmitting/receiving functions described throughout herein and at least in reference to FIGS. 2, 3, and 5. For example, camera control may include a signal for camera selection and adjustment directly to the cameras 608 from the server 604. However, the automatic directing module may be enabled closer to the cameras via the encoder/decoder 618 and transmitter/receiver 616, to cause the camera control for the cameras 608.

A server 604 may be at a live environment, but may also be at a distinct location from a live environment to perform decoding functions described throughout herein and at least in reference to FIGS. 2, 3, and 5. Such a server 604 may support a system 620 for camera handling in live environments 622. Such a system 620 may operate partly within a live environment 622. Such a tool 620 may include subsystems to perform functions described throughout herein.

The subsystems may be modules that may be able to test or train part of system 620, as described with respect to at least the ODTW and the tagging aspects herein. The subsystem may be encased in one or more computing devices having at least one processor and memory so that the at least one processor can perform functions based in part on instructions from the memory executing in the at least one processor. Even though illustrated together, the system boundary 620 may be part of one or more cameras 608 and an encoder 618 and transmitter/receiver 616. A server 604 and computing devices 610-614 may be in different geographic locations than the live environment.

One or more cameras 608 of a system 620 for camera handling in live environments is provided to enable capturing of views associated with the live environment 622. A system for camera handling in live environments may be adapted to transmit, either through wires or wireless, information received and further information processed therein. An encoder and transmitter 616 can communicate with one or more components within the system 620 and external to the system 620.

One or more component 604A-N may be adapted to function as a provisioning device within a server 604. Further, one or more components 604A-N may include one or more processors and one or more memory devices adapted to function for camera handling in live environments, while other processors and memory devices in server 604 may perform other functions.

A server 604 may also provide services or applications that are software-based in a virtual or a physical environment (such as to support the simulations referenced herein). When server 604 is a virtual environment, then components 604A-N are software components that may be implemented on a cloud. This feature allows for remote access to information received and communicated between any of aforementioned devices. One or more components 604A-N of a server 604 may be implemented in hardware or firmware, other than a software implementation described throughout herein. The method or system herein allows combinations thereof to also be used.

One computing device 610-614 may be a smart monitor or a display having at least a microcontroller and memory having instructions to enable display of information from the cameras 608. One computing device 610 may be a transmitter device to transmit directly to a receiver device or to transmit via a network 606 to a receiver device that may be part of an encoder and transmitter 616 and to transmit to a server 604, as well as to other computing devices 612, 614.

Other computing devices 612, 614 may include portable handheld devices that are not limited to smartphones, cellular telephones, tablet computers, personal digital assistants (PDAs), and wearable devices (head mounted displays, watches, etc.). Further, other computing devices 612, 614 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

Other computing devices 612, 614 may support applications designed as internet-related applications, electronic mail (email), short or multimedia message service (SMS or MMS) applications and may use other communication protocols. Other computing devices 612, 614 may also include general purpose personal computers and/or laptop computers running such operating systems as Microsoft Windows®, Apple Macintosh®, and/or Linux®. Other computing devices 612, 614 may be workstations running UNIX® or UNIX-like operating systems or other GNU/Linux operating systems, such as Google Chrome OS®. Thin-client devices, including gaming systems (Microsoft Xbox®) may be used as other computing device 612, 614.

The method or system herein uses network(s) 606 that may be any type of network that can support data communications using various protocols, including TCP/IP (transmission control protocol/Internet protocol), SNA (systems network architecture), IPX (Internet packet exchange), AppleTalk®, and/or variations thereof. The network(s) 606 may be a networks that is based on Ethernet, Token-Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

A server 604 runs a suitable operating system, including any of operating systems described throughout herein. Further, the server 604 may also run some server applications, including HTTP (hypertext transport protocol) servers, FTP (file transfer protocol) servers, CGI (common gateway interface) servers, JAVA® servers, database servers, and/or variations thereof. A database 602 is supported by database server feature of a server 604 provided with front-end capabilities. Such database server features include those available from Oracle®, Microsoft®, Sybase®, IBM® (International Business Machines), and/or variations thereof.

A server 604 is able to provide feeds and/or real-time updates for media feeds. A server 604 is part of multiple server boxes spread over an area but functioning for a presently described process. A server 604 includes applications to measure network performance by network monitoring and traffic management. A provided database 602 enables information storage from a live environment, including user interactions, usage patterns information, adaptation rules information, and other information.

The method or system herein is a SaaS (software as a service) approach using instructions on a non-transitory media that when installed and executed with at least one processor can cause the processor of a system for camera handling in live environments to perform certain functions. The production of video from concerts may be a function that ties together one or more aspects described herein, for instance. Approaches herein can replace an entire video production team. At the same time, approaches herein ensure a higher standard in the industry for quality and artistic integrity.

Organizers of classical music concerts and other types of concert and live performances may be able to use such a method and system via web-based or stand-alone platforms. This at least gives event organizers full control and flexibility to record and/or stream every live concert. Further, using AI/ML approaches herein, a combination of a live version and multiple video streams, according to predefined and changing scenarios (such as fixed direction or changed direction or adjustments) may be automatically generated. The video is then a directed video of the concert. The system herein also ensures that every performance of classical music will be recorded, and every recording will reflect carefully planned directing for the live environment.

The method and system herein enable concert organizers to access tools that will allow them to develop their activities in the digital and internet domains. For example, the software approaches herein automate a process of recording live environments (including live version of a musical score in performance) by tracking the musical score against the recorded version. Predefined and dynamic concert direction, such as by camera movements aimed at the performers or sections, in line with a musical score and in line with a director's vision may be achieved. Further, the method and system herein ensure that a solution is commonly applicable in regular concerts and also in progressive (modern) philharmonics, music universities, conservatoires, opera houses, individual artists, where a reduction in the high costs of recording is achievable.

The method and system herein can match a live version of a musical score to a recorded version, using ODTW. In the live environment, ODTW can determine, in real time, points in the live version of the musical score with respect to the recorded version. Then, using a previously-prepared script, controls may be enabled to a direction of one or more cameras for recording video or displaying video that pertains to predominant effects in the live version. For this purpose, cameras are used that allow remote control of the lens, as well as saving the frames that are used. Then, the cameras only broadcast or transmit according to the predominant effects that may be tagged as instructions in the recorded version. Further, images from the cameras may be recorded in a multi-track format and in the form of a mix, showing the image from one camera in accordance with the tags.

The method and system herein incorporate software having a set of libraries enabling, among others, multiple features described herein. For example, one feature is to track musical scores against a tonal music reference and to track musical scores against references in contemporary and atonal music. Further, recording of live environments, including concerts, according to the direction set by a concert organizer, eliminates need for manual calibration of cameras and translation of high-level tags into specific camera settings. Still further, multi-track camera recordings and a mix, such as synchronized video with the live version, can be used with images from one camera selected by the administrator. Therefore, the live environment may be a replay of at least the live version previously recorded and for which the video part is changed based on additional camera footage available and selected or adjusted to suit one or more frames of the replay of the live version.

The method or system herein can cause fully-automatic directing, without the need for additional information by storing or enabling tags in the recorded version. For example, such information relating to predominant effects may be translated into high-level tags and provided for specific camera settings. Then, using the knowledge of the tags that now represent established scene layout and techniques for automatic scene calibration (using tools such as depth camera), it is possible to record a direction to multi-track camera recordings and in the form of a mix—synchronized video with sound, showing the image always from one selected camera.

The method or system herein may be based on an audio-recognition problem, which answers to a question of where a performer is currently located in a musical score may be resolved. Further, a sound currently in a live version can be adjusted to the recorded version. A recorded version may be assigned or determined by an administrator, such as a direction, using a stream plan. The determination must be annotated in the system for camera handling in live environments to enable the method herein and therefore the determination of a musical score to be performed is an action within the system, such as a computer-based input to cause the features described herein to start for camera handling in live environments.

In the method or system herein, the live version may be matched to the recorded version using ODTW, which may be operating on properly processed sound (such as using chroma features, a variational autoencoder, a vector quantization, and a variational autoencoder). Further, in the live environment, as a ODTW module can determine, in real time, the part of the musical score being played, such determination may be used to control camera movements. The cameras are capable of remote lens movement, as well as saving frames unless in current recording mode. Further, an image from the cameras may be recorded in multitrack and in the form of synchronized video with sound, showing at least one image always from one camera, in accordance with the prepared scenario.

The system and method herein include software that are running on the server at a remote location than a live environment. For example, a part of the software may be located in a cloud that allows a client panel to make different adjustments. Further, audio/video signal retransmission may be performed after these are received from an on-site server at a live environment to a remote environment. The system and method herein are scalable to a different number of cameras, which can enable the system for camera handling in live environments to be adapted to different client requirements.

The method or system herein enables tracking of classical music tracks and recording and/or broadcasting live environments, such as live concerts. There may be necessary programming layers and data flows between the live version and a recorded version of a musical score. There may be key layers that are supported by innovative programming libraries responsible for preprocessing of live version, for tonal music tracking, or for a novel preprocessing method using the Variational Autoencoder or VQ-VAE neural network for contemporary and atonal music tracking.

The method or system herein includes determining a position in a live version relative to a recorded version during a live performance may use online Dynamic Time Warping (ODTW). The method and system herein enable a tracking system to be overhauled based on multiple recording version for the same musical score. This element stabilizes the operation of the algorithm described herein for ODTW and AI/ML aspects, and ensure the correct process of tracking the track, which may have different interpretations, different tempo.

A functionality of automatic scene calibration may be to perform fully automatic direction, without using additional information in the form of translating high-level tags into specific camera settings. Further, there may be remaining components in the method and system herein to correspond to the programming requirements typically found in organizations' infrastructures. Such requirements may schedule recorded versions to track live versions according to a schedule.

A system and method herein rely on programming libraries that implements methods for processing the audio signal; that supports determining live version positions relative to a recorded version position, and implementing the ODTW approach; that supports a process of updating the system herein for camera handling in live environments; that implements tools for preparation of directing, with particular emphasis on determining the action of cameras relative to the recorded version; and that supports a process for mapping labels to camera actions, with particular emphasis on remote movement of camera lenses. In total, it is possible to save frames and their development in accordance with the sequence that is the output of the libraries implementing tools for camera handling in live environments.

Furthermore, a system and method herein include a programming library to implement methods for recording recordings in either multitrack and mixed tracks; a development library to implement tools to synchronize a live version with a mixed recorded version; and a programming library to implement methods for automatic scene calibration.

In addition, a programming library herein may be adapted to determine a type of musician (such as the instrument), to implement methods for determining a location (coordinates) of people on a stage (using neural networks for detection) based in part on calibrated space designated by a library implementing the tools for automatic scene calibration, and then comparing these coordinates with coordinates of the musicians' sections on an inaccurate stage plan.

A further programming library herein supports directing the preparation process. There may be dedicated universal pattern or standards of software architecture used in the present method and system. This approach can account for necessary programming layers and data/information that flows there between. Further, there may be key layers corresponding to the libraries/modules.

The method or system herein includes instructions (including documentation and sample realizations) for integrating programming layers within the above-refenced features can account for the adaptation of existing and missing components. The system and method herein enable the recording and/or transmission of live environments (including live performances) with the use of multiple cameras mixed in real time to address complexity and costs of arranging a live concert recording and/or broadcast, which is handled by a professional live production and production company.

Furthermore, many people may be involved in a live production, including camera operators, art director, score readers, among others. There may be costs associated with streaming management and setup for technicians. There may be logistical concerns in such live production, such as associated with recording recordings from multiple cameras.

The system and method herein also make it easier for concert organizers and individual artists to reach a wider audience by enabling their participation in digital form and sharing concerts online. The implementation of such a goal in terms of the developed solution—requiring the employment of a professional company dealing in production and implementation of live broadcasts—causes complexity and costs overrun than would be beneficial to a community seeking such content. The entire process of broadcasting a classical music concert live, automated using the developed system, allows concert organizers to save costs and complexity, while increasing the potential audience.

The system and method herein may serve as a camera operator, score reader, and art director, all rolled into one. The system and method address issues related to atonal classical music using pre-processing with a neural network model supported by VQ-VAE aspects as described with respect to one or more of the Figures here with. The system and method herein make high-quality multi-camera concert broadcasts accessible to everyone and enables classical music will be more accessible than ever before. Further, such an approach may replace a per-concert model that requires advanced planning and high costs. The unlimited model of the present system and method can enable customers to record each performance quickly and easily.

A method herein is for tracking of a live version of a musical score to enable camera handling in live environments. A system associated with the method includes memory and at least one processor to execute instructions stored in the memory to perform steps in the method. A step in the method includes determining a musical score to be performed in the live environment. The method further includes analyzing a live version of the musical score with the recorded version of the musical score in a live environment. The analysis is to determine a time-based difference of at least one frame in the live version against the recorded version, where the time-based difference is to be used, along with at least one predominant effect of the recorded version or the live version, to enable camera selection or camera adjustments of one or more cameras in the live environment.

Another method herein is for camera handling in live environments. A system associated with the method includes memory and at least one processor to execute instructions stored in the memory to perform steps in the method. A step in the method includes determining a musical score to be performed in the live environment. The method further includes determining at least one predominant effect in a live version or recorded version of the musical score. A live version of the musical score is analyzed frame-by-frame with a recorded version of the musical score in the live environment. The method includes selecting or adjusting one or more cameras in a live environment to point in a direction associated with at least one predominant effect, using a time-based difference from the frame-by-frame analysis.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening.

Recitation of ranges of values herein are merely intended to serve as a shorthand method of referring individually to each separate value falling within range, unless otherwise indicated herein and each separate value is incorporated into specification as if it were individually recited herein. The use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. Further, a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). A number of items in a plurality is at least two but can be more when so indicated either explicitly or by context. Further, unless stated otherwise or otherwise clear from context, phrases such as based on means based at least in part on and not based solely on.

Operations of methods in FIGS. 5A and 5B, and the sub-steps described herein can be performed in any suitable order unless otherwise indicated herein or otherwise clearly contradicted by context. The method or system herein includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

Such code may be stored on a computer-readable storage medium. Such code may be a computer program having instructions executable by one or more processors. A computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. Further, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

A set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. Executable instructions are executed such that different instructions are executed by different processors—a non-transitory computer-readable storage medium stores instructions and a main central processing unit (CPU) executes some of instructions while other processing units execute other instructions. Further, different components of a computer system have separate processors and different processors execute different subsets of instructions.

The computer systems are configured to implement one or more services that singly or collectively perform operations of processes described herein and such computer systems are configured with applicable hardware and/or software that enable performance of operations. A computer system that implements at least one embodiment of present disclosure is a single device or is a distributed computer system having multiple devices that operate differently such that distributed computer system performs operations described herein and such that a single device does not perform all operations.

Even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

Although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

What is claimed is:

1. A processor-implemented method, comprising:

determining, by at least one processor, that at least one audio frame of a live version of a musical score being performed in a live environment corresponds to a recorded audio frame of a recorded version of the musical score; and enabling, by at least one camera, a camera movement that is according to a time-based reference between the at least one audio frame and the recorded audio frame and that is according at least one predominant effect comprising audio and video of the recorded version or the live version.

2. The processor-implemented method of claim 1 wherein the predominant effect is in a form of an instruction that is stored in a memory with the recorded version of the musical score and that is to be executed by the at least one processor, and wherein the instruction comprises, for the at least one audio frame, at least one of a musical performer to be captured by the at least one camera using the camera movement or a type of immersive experience to be generated and captured by the at least one camera, and wherein the processor-implemented method further comprises:

enabling the camera movement to capture the musical performer or the immersive experience; and including the camera movement with the live version of the live environment.

3. The processor-implemented method of claim 2, further comprising:

enabling the instruction to be provided in a computer-based input and to be based on the recorded version of the musical score.

4. The processor-implemented method of claim 2, wherein the immersive experience is generated for the at least one audio frame of the live version and wherein the type of the immersive experience is at least one of: a graphical visualization being displayed during the live version or text being displayed to an audience of the live environment.

5. The processor-implemented method of claim 4, further comprising:

adjusting, dependent on features derived from the audio and video of the live environment, the camera movement or the immersive experience, wherein the features comprise at least one of a volume or a level of expression of emotions of the musical performer, and wherein the adjusting comprises at least one of camera zooming or tuning of colors of the graphical visualization or the text.

6. The processor-implemented method of claim 5, further comprising:

determining the level of expression of emotions of the musical performer based at least in part on a machine learning algorithm tracking a facial matrix of the musical performer in the live version of the musical score.

7. The processor-implemented method of claim 5, wherein the adjusting of the camera movement or the immersive experience is further based in part on object tracking preformed for the live version of the musical score.

8. The processor-implemented method of claim 1, further comprising:

enabling the camera movement using a plurality of cameras of the at least one camera, wherein the camera movement comprises particular actions performed on particular ones of the plurality of cameras.

9. The processor-implemented method of claim 8, further comprising:

modifying, in real time, the camera movement based at least in part on determination of a problem with the at least one camera or a further camera associated with the at least one camera.

10. The processor-implemented method of claim 1 further comprising:

determining, for the at least one audio frame of the live version of the musical score, the recorded audio frame of the recorded version of the musical score based on a machine learning algorithm, the machine learning algorithm to extract features describing the at least one audio frame and the record audio frame and to use online dynamic time warping (ODTW) to determine associations between the features.

11. The processor-implemented method of claim 10, further comprising:

continuously improving the machine learning algorithm based at least in part on feedback provided by users, wherein the feedback is collected via a computer-based input and wherein the feedback comprises mistakes in the frame matching; and the feedback being added to a training data set for the machine learning algorithm.

12. The processor-implemented method of claim 10, further comprising:

enabling the machine learning algorithm to use outcomes from previous live environments of the musical score, wherein the recorded audio frame determined using the at least one audio frame enables consecutive audio frames matches between the live version and the recorded version.

13. The processor-implemented method of claim 10 further comprising:

enabling the machine learning algorithm to use a degree of confidence, wherein a first predetermined value of the degree of confidence allows the machine learning algorithm to influence the camera movement by one or more of switching to other types or settings of predominant effects or keeping the at least one camera or a plurality of cameras in a switched mode until the machine learning algorithm regain a second predetermined value of the degree of confidence for next audio frames of the live version or the recorded version of the musical score.

14. The processor-implemented method of claim 13, wherein the switching comprises at least one of redirecting the at least one camera or a plurality of cameras to capture a conductor of the musical score or reducing effects associated with the at least one predominant effect based on an immersive experience associated with the live version of the musical score.

15. The processor-implemented method of claim 1, further comprising:

storing a plurality of recorded versions that are different versions of the musical score, along with associated predominant effects; and determining the recorded version from a plurality of recorded versions to be used with the live version at a beginning of the musical score based in part on a difference between the at least one audio frame and individual ones of a plurality of recorded audio frames of the plurality of recorded versions.

16. The processor-implemented method of claim 1, further comprising:

determining the recorded version of a plurality of recorded versions to be used with the live version of the musical score based in part on a degree of confidence with which a machine learning algorithm, which is responsible for determination of the recorded audio frame associated with the at least one audio frame, provides an output using the at least one audio frame against a plurality of recorded audio frames of the plurality of recorded versions.

17. The processor-implemented method of claim 16, further comprising:

enabling the camera movement for the at least one camera or a plurality of cameras using preliminary instructions until the recorded version is determined with a predetermined value of a degree of confidence, wherein the determination of the recorded version is performed in real time or in near real time using a scalable cloud environment and using a plurality of recorded versions; and sending information associated with the recorded version to the at least one camera or to a plurality of cameras; and enabling further real time determination of another recorded audio frame to be used with the live version using an edge environment that is associated with the scalable cloud environment.

18. The processor-implemented method of claim 1, further comprising:

capturing the live version using the at least one camera or a plurality of cameras, wherein the capturing is synchronized in real time with live audio and used in at least one of an online broadcasting, a television-based live entertainment production, or a production of a musical score recording.

19. The processor-implemented method of claim 18, further comprising:

enabling the camera movement to obtain a plurality of live versions of the musical score for different ones of the online broadcasting, the television-based live entertainment production, or the production of the musical score recording.

20. The processor-implemented method of claim 1, further comprising:

enabling turning on or off at least one function associated with the processor-implemented method using a computer-based input that reports at least one aspect of the musical score, the at least one function to control a level of automation of camera movement.

* * * * *